United States Patent
Kikuchi et al.

[11] Patent Number: 5,811,051
[45] Date of Patent: Sep. 22, 1998

[54] METHOD AND APPARATUS FOR CONTINUOUSLY DRAW-MOLDING FIBER REINFORCED PLASTIC ROD FORMED WITH SPIRAL GROOVE

[75] Inventors: Masao Kikuchi; Junji Hosokawa; Akira Sumitani; Haruhito Akimoto; Toshiharu Abekawa; Eri Suda; Shuji Shimozono, all of Kanagawa-ken; Nobuyuki Ozawa, Chiba-ken, all of Japan

[73] Assignees: Komatsu Ltd.; Komatsu Plastics Industry Co., Ltd., both of Japan

[21] Appl. No.: 649,669

[22] PCT Filed: Dec. 2, 1994

[86] PCT No.: PCT/JP94/02036

§ 371 Date: May 28, 1996

§ 102(e) Date: May 28, 1996

[87] PCT Pub. No.: WO95/15255

PCT Pub. Date: Jun. 8, 1995

[30] Foreign Application Priority Data

Dec. 3, 1993 [JP] Japan .................................. 5-303993

[51] Int. Cl.⁶ .................................................. B29C 59/02
[52] U.S. Cl. ........................... 264/409; 156/64; 156/166; 156/180; 156/441; 264/40.1; 264/137; 425/93; 425/500
[58] Field of Search .................................... 264/137, 409, 264/40.1; 425/93, 500; 156/166, 180, 441, 64

[56] References Cited

U.S. PATENT DOCUMENTS 3,108,921 10/1963 Gillman et al. .
4,770,832 9/1988 Okamoto et al. .................. 264/137 X

FOREIGN PATENT DOCUMENTS

| 266 755 | 5/1988 | European Pat. Off. . |
|---|---|---|
| 560 362 | 9/1993 | European Pat. Off. . |
| 667 228 | 8/1995 | European Pat. Off. . |
| 56-34431 | 4/1981 | Japan . |
| 57-18484 | 4/1982 | Japan . |
| 62-176950 | 8/1987 | Japan . |
| 3-33045 | 2/1991 | Japan . |
| 4-12828 | 1/1992 | Japan . |
| 4-224154 | 8/1992 | Japan . |
| 5-124115 | 5/1996 | Japan . |
| WO93/08977 | 5/1993 | WIPO . |

*Primary Examiner*—Leo B. Tentoni
*Attorney, Agent, or Firm*—Rader, Fishman & Grauer; Ronald P. Kananen

[57] ABSTRACT

A method of continuously draw-molding a fiber reinforced plastic rod formed with a spiral groove includes the steps of arranging in parallel a plurality of reinforcing fibers under tension, impregnating an unhardened thermosetting resin in the reinforcing fibers with tension being applied to the reinforcing fibers, winding a tape having a resin impregnable property and an expandible and contractible property around a fiber bundle composed of the thermosetting resin impregnated reinforcing fibers in a spiral fashion with a winding angle being substantially equal to an angle of the spiral groove with respect to an axial direction of a rod to be molded, passing the fiber bundle with the wound tape in a heating mold provided with a hole having a cross section substantially equal to that of the rod to be molded to heat and harden the thermosetting resin, and taking up the tape thereafter.

13 Claims, 10 Drawing Sheets

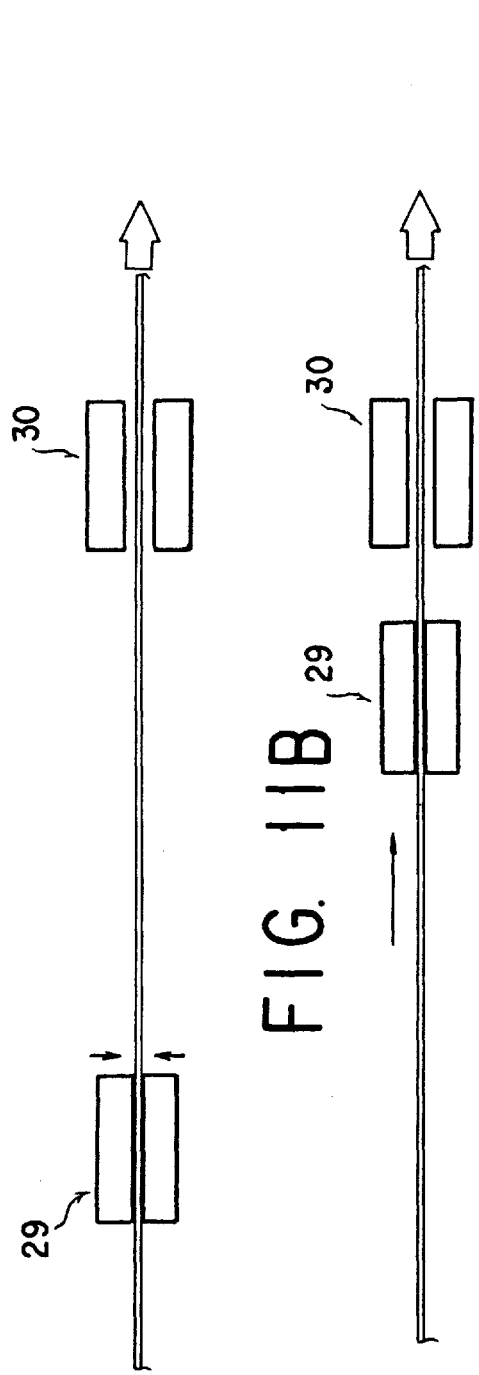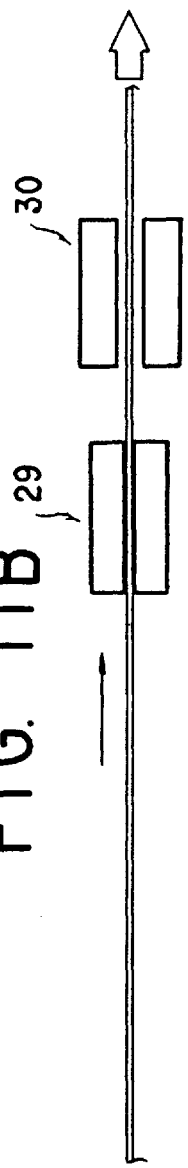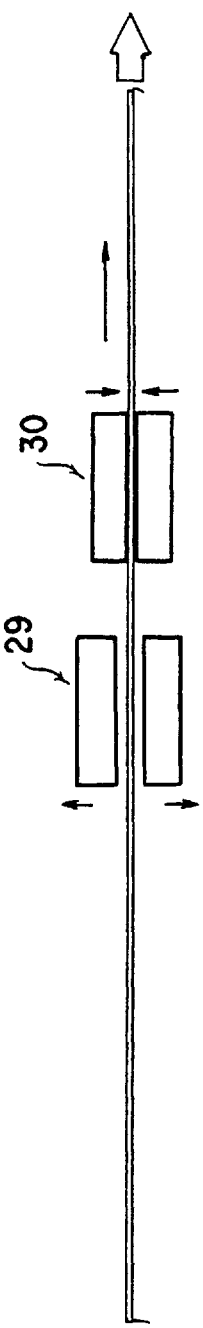

METHOD AND APPARATUS FOR CONTINUOUSLY DRAW-MOLDING FIBER REINFORCED PLASTIC ROD FORMED WITH SPIRAL GROOVE

TECHNICAL FIELD

The present invention relates to method and apparatus for continuous draw-molding a concrete reinforcing member, particularly a fiber reinforced plastic (FRP) rod formed with a spiral groove.

BACKGROUND ART

In recent years, there has arisen a problem with steel members used as concrete reinforcing members such that the steel members corrode by being exposed to salinity contained in sea sand mixed in concrete material or to salinity at a time when the concrete cracks under a severe salinity condition. In view of such problem, there is a tendency to use an FRP rod as a reinforced member which is in superior in its corrosion proof property in substitution for the steel member. It is necessary for the FRP rod like the steel member to make strong a binding force to the concrete, and as one method therefor, grooves are formed to the circumferential surface of the FRP-made reinforcing member, and there is provided a draw-molding method, as one of FRP-made reinforcing member molding methods, in which fiber is moved in a longitudinal direction of the member.

For example, there are known Japanese Patent Publication No. SHO 57-18484, Japanese Patent Laid-open Publication No. HEI 3-33045, Japanese Patent Laid-open Publication No. HEI 4-12828, and Japanese Patent Laid-open Publication No. HEI 5-124116 which disclose methods and apparatus for draw-molding FRP rods formed with spiral grooves.

In these prior art documents, the apparatus disclosed in the Japanese Patent Publication No. SHO 57-18484 is represented by a structure shown in FIG. 1, in which glass fibers c impregnated with thermosetting resin b are arranged in parallel under tension on a surface of a mandrel a and the glass fibers c are then passed through a heating mold d to form them in a semi-hardened state as glass fiber reinforced resin material g. In the next step, a metal wire filament e having a surface which is coated or covered by a mold releasing agent is continuously wound up around the surface of the glass fiber reinforced material in a spiral fashion, and thereafter, it is heat hardened in a heating furnace f. Finally, by removing the metal wire filament e from the surface of the glass fiber reinforced material g, the spiral groove h is formed on the surface thereof.

Further, in these prior art documents, the apparatus disclosed in the Japanese Patent Laid-open Publication No. HEI 3-33045 is represented by a structure shown in FIG. 2, in which a wire-like fiber base material c' is impregnated with a thermosetting resin b, and then, the fiber base material c' is passed through a preform mold i' to make the resin to a unhardened or semi-hardened state. Thereafter, a wire filament e' having tenacity is wound up around the surface of the fiber base material c' in a spiral fashion with a predetermined space, and a heat-resisting tape j is also wound up in a spiral fashion around the surface of the fiber base material c' so as to cover a surface portion not covered by the wire filament e'. Under this condition, the fiber material base c' is heat hardened in a heating furnace f, and finally, the wire filament e' and the heat-resisting tape j are removed from the surface thereof to thereby form a spiral groove h thereon.

Furthermore, in these prior art documents, the apparatus disclosed in the Japanese Patent Laid-open Publication No. HEI 4-12828 or NO. HEI 5-124116 is represented by a structure shown in FIG. 3, in which a belt-shaped material m is wound up around an FRP rod k before hardening and then is hardened in a heating furnace f. Thereafter, a spiral groove h is formed by removing the belt-shaped material m.

However, the methods and apparatus for continuous draw-molding the spiral grooved FRP rods in the prior arts described above involve the following problems.

First, according to the structure of the apparatus disclosed in the Japanese Patent Publication No. SHO 57-18484, the glass fibers c impregnated with the thermosetting resin b are semi-hardened and, in the next step, the metal wire filament e for forming the spiral groove to the glass fibers c is wound up therearound and then heat hardened. In this process, it is not specifically mentioned, in view of the drawing of FIG. 1, the hardening process is performed with a gap between the heating furnace f and the resin impregnated fiber. That is, since the inner surface of the furnace and the fiber surface are in a non-contact state, the heat is not effectively exchanged therebetween, and accordingly, it will be difficult to form a product so as to have a smooth surface. Furthermore, although a sectional shape of the metal wire filament e is not specifically referred to with respect to a first embodiment, according to the structure of a second embodiment in which a groove is formed by, in place of using the wire filament, passing in a rotating mold having a spiral shaped projection, the projection has a circular sectional shape, and, hence, a product is also formed with a groove having a circular sectional shape.

As a characteristic feature required for a concrete reinforcing member, it will be listed that the reinforced member has high strength and high concrete adhesive force. In order to obtain the high strength, it is necessary to make shallow the depth of the groove and to make small an orientation angle of the fiber, and on the other hand, in order to obtain the high concrete adhesive force, it is required to make large the depth of the groove or to make large the surface area of the groove. In these views, in order to obtain the high strength and high adhesive force, it is desired to make large the surface area of the groove. However, in the case of the circular sectional shape of the groove, there is a limit to increase the surface area of the groove without increasing the depth thereof. Furthermore, in this document, the method and apparatus for winding the metal wire filament e and releasing the same are disclosed merely in a generic way.

Further, according to the structure of the Japanese Patent Laid-open Publication No. HEI 3-33045, the wire filament e' having tenacity is used, and in its embodiment, a metal wire or resin wire having a circular cross section is shown. Therefore, according to this prior art, as like as in the former prior art, a reinforced member satisfying both the high strength and high concrete adhesive force is not obtained.

Furthermore, in this prior art example, since the wire filament is wound up in a state that a portion of half diameter of the circular wire filament e bites the resin impregnated fiber, another portion having another half diameter thereof protrudes outside the fiber surface, and since the protruded outside portion is covered by the heat-resisting tape j and then heat hardened, the inner surface and the fiber surface are in a non-contact state as in the former prior art structure. In this example, resin and metal are listed as a material substance, and furthermore, the method and apparatus for winding the wire filament having tenacity and taking up the same are not disclosed concretely.

Still furthermore, according to the structure of the Japanese Patent Laid-open Publication No. HEI 4-12828 or NO. HEI 5-124116, the belt-shaped material m such as a rope shaped synthetic resin is used and the hardening and molding processes are performed at the same time in the mold, but there is no disclosure as to the concrete shape of the belt-shaped material m. Moreover, since the rotating speed for winding up the belt-shaped material m is associated with the molding speed to make it constant, there arises an inconvenience at the time taken. That is, the setting to the constant wind-up speed provides no problem, but if the taking up speed is made constant when the wire filament is released, even if a molded rod drawing speed and a belt-shaped material winding speed are made constant at the molding time, slight divergence in the speeds will be caused in accordance with performances in motor driving speeds of a molded rod drawer and a belt-shaped material winding apparatus, which will result in significant minute change in pitches of the belt-shaped material m. For example, in a case where grooves each having a 4 mm width are formed on a surface of a rod having a diameter of 8 mm in cross spiral shape, even if the rotating speed and the winding speed are set so as to provide 40 mm pitch, this pitch is shifted to 39 mm for the reason described above, and in such case, the surface area of the groove changes from 36.0% to 36.2%, which will hardly affect on the concrete adhesive force as a product. In an actual molding process, this pitch will be often further shifted slightly during the continuous drawing processes, but this will hardly affect on the quality of the product. However, in an actual continuous molding process, concerning the take-up position, the shifting of 1 mm in pitch will result in the shifting of 250 cm in the take-up position from the molding stating time when the material having 100 m length is molded. In this meaning, in the case of constant take-up speed of the take-up apparatus, the tape cannot be exactly taken up.

The present invention was conceived to improve the defects mentioned above and has an object for providing a method and apparatus for continuously draw-molding an FRP rod formed with a spiral groove capable of providing a smooth outer peripheral surface of the spiral-grooved FRP rod without fluctuating a pitch of the spiral groove in the longitudinal direction thereof, providing finely arranged reinforcing fibers in parallel in a pulling state, uniformly impregnating a resin in the reinforcing fibers, and being free from twisting of the fibers at a tape wind-up time.

DISCLOSURE OF THE INVENTION

To achieve the above object, according to one embodiment of the present invention, there is provided a method of continuously draw-molding a fiber reinforced plastic rod formed with a spiral groove, the method comprising the steps of arranging in parallel under tension a plurality of reinforcing fibers, impregnating an unhardened thermosetting resin in the reinforcing fibers with tension being applied to the reinforcing fibers, winding a tape having a resin impregnable property and an expandable and contractible property around a fiber bundle composed of the thermosetting resin impregnated reinforcing fibers in a spiral fashion with a winding angle being substantially equal to an angle of the spiral groove with respect to an axial direction of a rod to be molded, passing the fiber bundle with the wound tape in a heating mold provided with a hole having a cross section substantially equal to that of the rod to be molded to heat and harden the thermosetting resin, and then taking up the tape thereafter.

According to the method mentioned above, the formation of the groove is performed in a manner that the flat tape having a property capable of being impregnated with a resin and having an expandable and contractible property is wound up around the fiber bundle impregnated with the unhardened thermosetting resin and the fiber bundle is then passed through the heating mold, whereby the molding and hardening processes can be simultaneously performed in the heating mold having a cross-sectional shape substantially equal to that of the fiber reinforced plastic rod to be molded with the tape wound around the fiber bundle to thereby obtain a product having a smooth finishing surface as like as a product obtained without winding up a tape and prevent the pitch of the spiral groove from fluctuating in the longitudinal direction thereof.

Particularly, since the tape has an expandable and contractible property, the tape can be absorbed a slight change in the pitch during the molding operation without generating any wrinkling to thereby form the good groove to a product. In addition, since the tape is also provided with the resin impregnable property, the tape wound around the fiber bundle can be impregnated with the resin, and since the resin is hardened during the heat hardening process, the strength of the tape can be increased because of the resin impregnation and the tape can be taken up without being broken. Further, when the tape is hardened with the resin layer formed on the surface of the tape, the product provides a superior smooth surface like a surface of a product which is obtained through an ordinary draw-molding process. Furthermore, since the product has a smooth surface, when the product is used as a concrete tensioning member, a stress concentration on the product at a time of applying a tension by clamping it by a wedge-shaped fixing member can be weakened.

Furthermore, since the tension is applied at a time of supplying the reinforcing fibers, the reinforced fibers can be finely arranged in parallel and any entanglement of the fibers in the resin impregnating unit can be prevented and, hence, the resin impregnation can be done uniformly, and still furthermore, the generation on feather of the fiber bundle can be also suppressed at the squeezing time just after the resin impregnation by means of the squeezing member and only the excessive resin can be removed. The bending or fluctuating of the fiber bundle and the twisting of the fibers at the tape wind-up time can be also prevented.

In addition to the above features, it is desired that the hole of the heating mold has an inlet portion formed with a taper portion widened in diameter at an inlet side and the fiber bundle is guided into the heating mold through the inlet portion.

According to this additional feature, the fiber bundle impregnated with the unhardened resin with the tape being wound up therearound can be smoothly pulled into the mold, so that the tape is not slackened at the inlet portion of the mold. Furthermore, since the tape wound up around the surface of the fiber bundle bites the surface through the gradually increasing pressure application along the taper shape of the mold inlet portion and, finally, the surface of the tape is made equal to the fiber bundle surface during the moving in the mold, the tape wound-up position does not fluctuate during the movement, thus surely performing the molding thereof. At the same time, the inner surface of the mold slides along the fiber bundle surface to thereby effectively harden the unhardened resin.

According to the other embodiment of the present invention, there is provided an apparatus for continuously draw-molding a fiber reinforced plastic rod formed with a spiral groove, the apparatus comprising a fiber supplying device for supplying a fiber bundle which is composed of a plurality of fibers under predetermined tension being applied, a resin impregnating device for impregnating an unhardened thermosetting resin in the fiber bundle supplied from the fiber supplying device, a tape wind-up device for applying a tension to a tape and winding the tape around the fiber bundle at a constant tape wind-up angle on the fiber bundle with a predetermined pitch, a heating mold having a cross-sectional shape substantially equal to that of a rod to be molded, in which the thermosetting resin is hardened during the passing of the fiber bundle in the heating mold, a tape take-up device, including a control mechanism for controlling a tape take-up position to be substantially constant, for taking up the tape from the fiber bundle discharged from the heating mold, and a rod drawing device for drawing out the rod molded in the heating mold therefrom.

According to this structure, since the tape wind-up device is provided with a mechanism for applying a tension to the tape, the tape can tightly contact the unhardened resin impregnated fiber bundle at the time of guiding the tape into the mold without being slackened to thereby mold a product with a constant pitch.

Furthermore, since the tape take-up device is provided with the tape take-up position control mechanism, the tape can be smoothly taken up and makes it possible to carry out the continuous draw-molding process for a long time.

Further, it is desired that the heating mold has a hole having an inlet portion formed with a taper portion widened in diameter.

BRIEF DESCRIPTION OF THE DRAWINGS

The present invention will be understood more clearly by the detailed explanation described hereinafter and with reference to the accompanying drawings representing embodiments of the present invention. Further, the embodiments shown in the drawings are not made to specify the invention and made for easy understanding of the invention.

In the accompanying drawings:

FIG. 11(a), FIG. 11(b) and FIG. 11(c) are views showing a function of another example of a rod drawing device of the embodiment of FIG. 4.

BEST MODE FOR EMBODYING THE INVENTION

Hereunder, method and apparatus for manufacturing a fiber reinforced plastic rod formed with a spiral groove according to a preferred embodiment of the present invention will be described with reference to the accompanying drawings.

The embodiment is described with reference to FIGS. 4 to 15.

Figure 1:
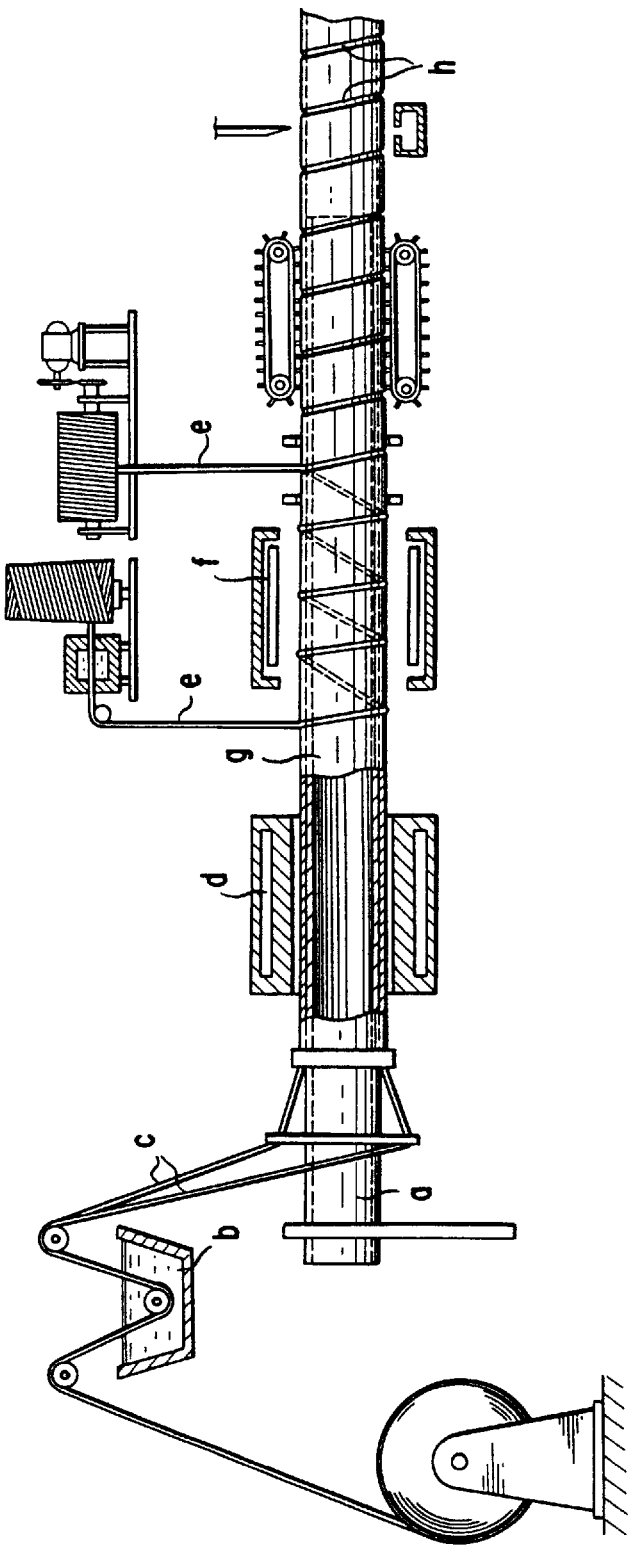
FIG. 1 is a view showing a first example of a conventional draw-molding apparatus.
Figure 2:
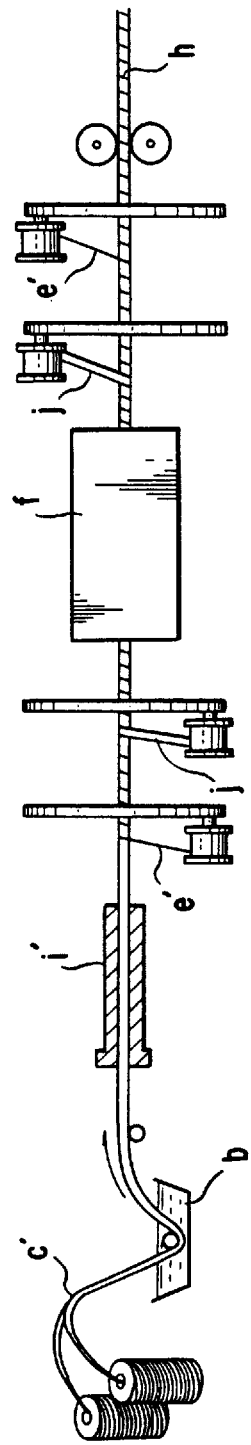
FIG. 2 is a view showing a second example of a conventional draw-molding apparatus.
Figure 3:
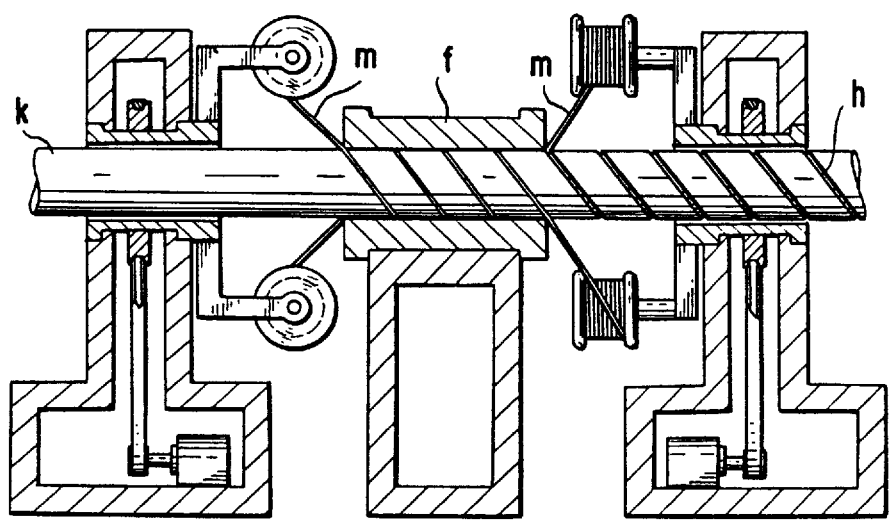
FIG. 3 is a view showing a third example of a conventional draw-molding apparatus.
Figure 4:
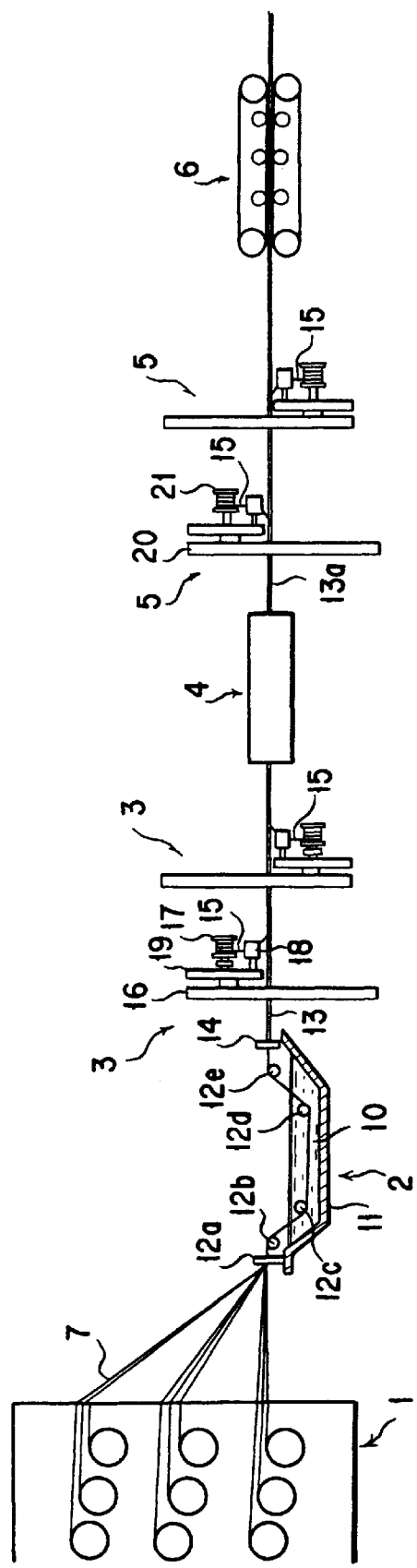
FIG. 4 is a schematic view showing one embodiment of an apparatus for performing a method of the present invention.

FIG. 4 represents one embodiment of the present invention. In the embodiment, a roving rack 1, a resin bath unit 2, a tape wind-up device 3, a heat molding unit 4, a tape take-up device 5 and a rod drawing device 6 are arranged linearly in this order from an upstream side of a working line.

Figure 5:
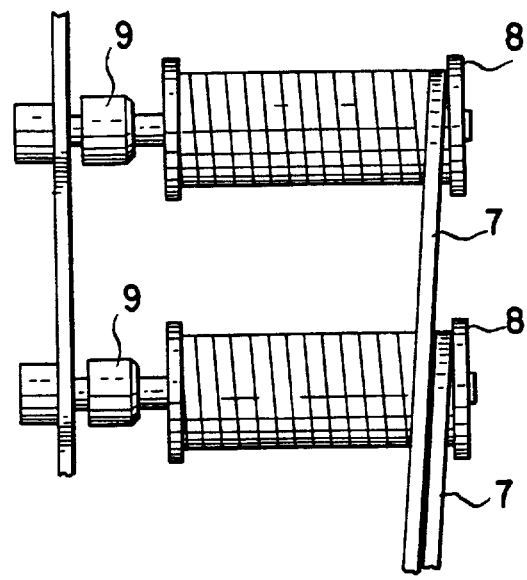
FIG. 5 is a view showing an important portion of one example of a roving rack of the embodiment of FIG. 4.

The roving rack 1 serves to draw a number of reinforcing fibers 7 while applying tension thereto. Means for applying such tension is shown in FIG. 5 in which torque limiters 9 are mounted to rotation support portions of bobbins 8 around which the reinforcing fibers 7 are wound up and the bobbins 8 are rotated against the rotation resistance of the torque limiters 9.

Figure 6:
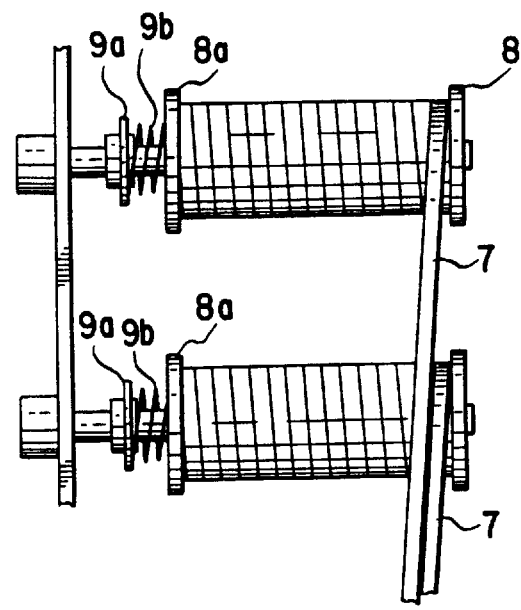
FIG. 6 is a view showing an important portion of another example of a roving rack of the embodiment of FIG. 4.

FIG. 6 shows another example of the torque limiters 9, in which spring members 9b are interposed between side plates 8a of the bobbins 8 and pressure plates 9a, respectively, to apply a necessary resisting force. In this example, the pressing force will be adjusted by changing the position of the pressure plate 9a in arrangement.

The resin bath unit 2 is composed of a resin bath 11 filled with a thermosetting resin 10 in a molten state, a plurality of guide members 12a, 12b, 12c, —for guiding a number of the reinforcing fibers 7 drawn out from the roving rack 1 to the resin bath 11, and a squeeze member 14 disposed on an outlet side of the resin bath unit 2 and adapted to bundle the reinforcing fibers 7 into a fiber bundle 13 and to squeeze it for removing excessive resin.

The tape wind-up device 3 serves to wind up a tape 15 around the fiber bundle 13, in a spiral fashion, which is impregnated with an unhardened resin bundled by and drawn out from the squeeze member 14. The tape wind-up device 3 comprises, as shown in FIG. 4, a rotary plate 16 through which the fiber bundle 13 penetrates, a tape bobbin 17, a tape guide 18 for guiding the tape fed from the tape bobbin 17, and a torque limiter 19 for applying predetermined tension to the tape 15.

Figure 7:
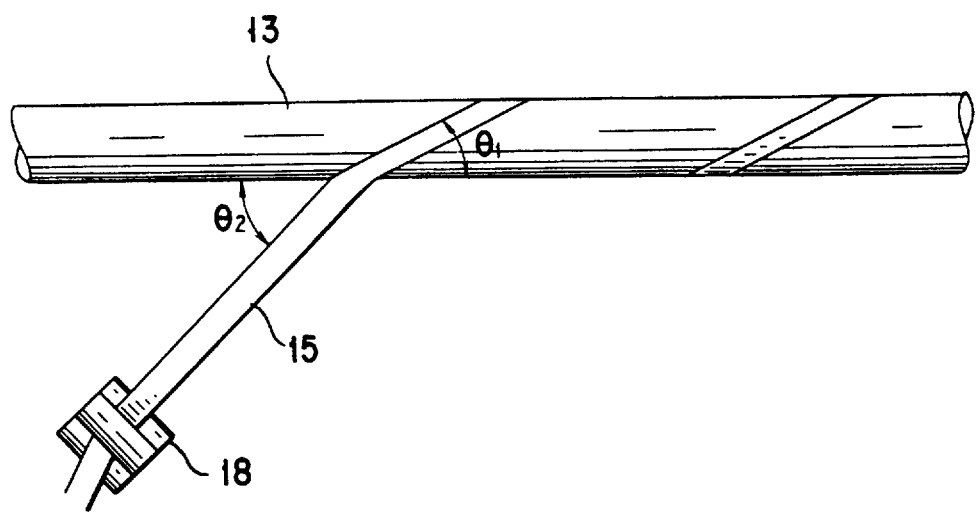
FIG. 7 is a view showing a tape wind-up condition of the embodiment of FIG. 4.

In the tape wind-up device 3, an angle $\theta_2$ of the tape 15 to the fiber bundle 13 is controlled, as shown in FIG. 7, so that the wind-up angle $\theta_1$ is made constant in response to a drawing speed of the fiber bundle 13.

Further, it is to be noted that two sets of the tape wind-up devices 3 having winding directions reverse to each other are arranged so as to use two sets thereof at the same time or use subsequently one by one selectively.

Figure 8:
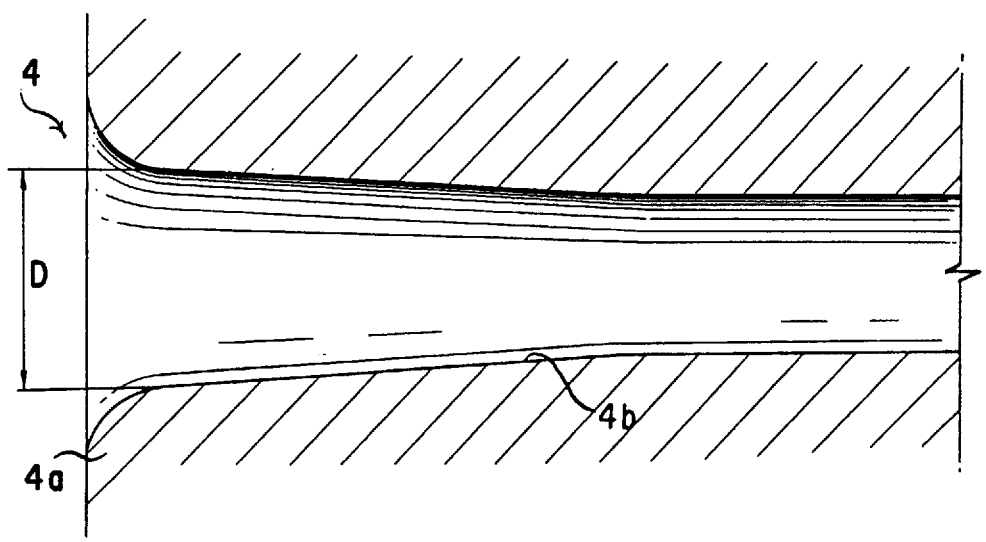
FIG. 8 is a sectional view showing an inlet portion of a heat molding apparatus in the embodiment of FIG. 4.

The heat molding unit 4 serves to heat the fiber bundle 13 during the passing therein to heat and harden the unhardened resin impregnated in the fiber bundle 13. FIG. 8 shows a cylindrical mold 4a of the heat molding unit 4, and an inlet corner portion of a hole 4b of the mold 4a has a circular section and provides a slant taper shape having a larger diameter on an inlet side of the hole 4b and another portion of the hole 4b has an inner diameter substantially according with a diameter of a rod to be molded. The diameter D of the opening on the inlet side of the hole 4b is made larger than that of the other portion by, in a radius dimension, a thickness of the tape 15 such as, for example, 0.1 mm, and the tapered portion has a length of about 20 mm in the case of the diameter of the rod to be molded of 8 mm. The term "taper" used herein merely means that the cross sectional area of the hole 4b on its inlet side gradually increases towards the inlet side, and hence, a linear line shape or parabolic curve shape may be included in this term "taper".

The tape take-up device 5 serves to peel off the tape 15 from a rod 13a molded in and drawn out from the heat molding unit 4 and take up the same, wherein a tape take-up bobbin 21 is mounted to a rotary plate 20 so that the rotary plate 20 rotates in a direction reverse to that of the tape wind-up device 3.

Two sets of such tape take-up devices 5 are arranged in a manner of having take-up directions reverse to each other in correspondence to the tape wind-up devices 3 capable of using two sets thereof at the same time or use subsequently one by one selectively.

Figure 9:
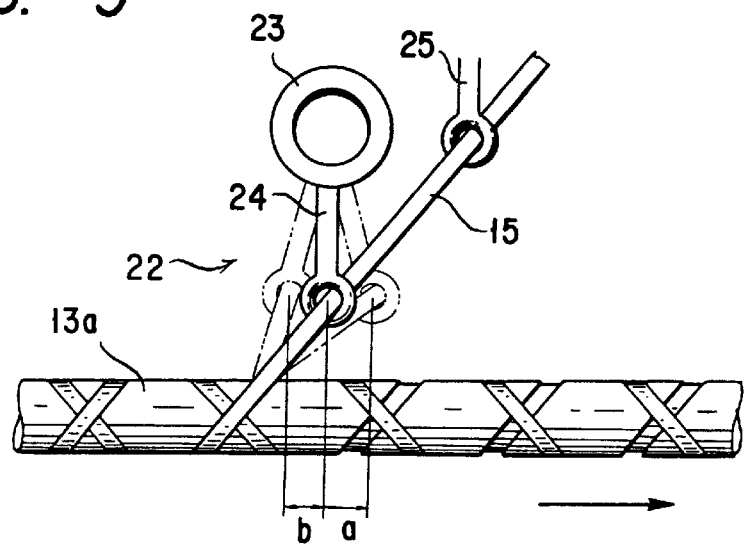
FIG. 9 is a view showing an important portion of one example of a tape take-up portion of the embodiment of FIG. 4.

FIG. 9 shows one example of the tape take-up guide means of the tape take-up device 5. A guide section 22 is composed of a free guide 24 provided with an angle sensor 23 and a stationary guide 25. The free guide 24 provided with the sensor detects the shifting, in the axial direction, of the position of the take-up device for the tape 15 wound up around the molded rod 13a by, for example, 5 mm on the downstream side (i.e. a-direction) or on the upstream side (i.e. b-direction) and, upon the detection, controls the rotating speed for the tape take-up to increase or decrease. Further, in such case, it is desired that the distance between the guide portion of the free guide 24 provided with the angle sensor 23 and the molded rod 13a is about 10 mm.

Figure 10:
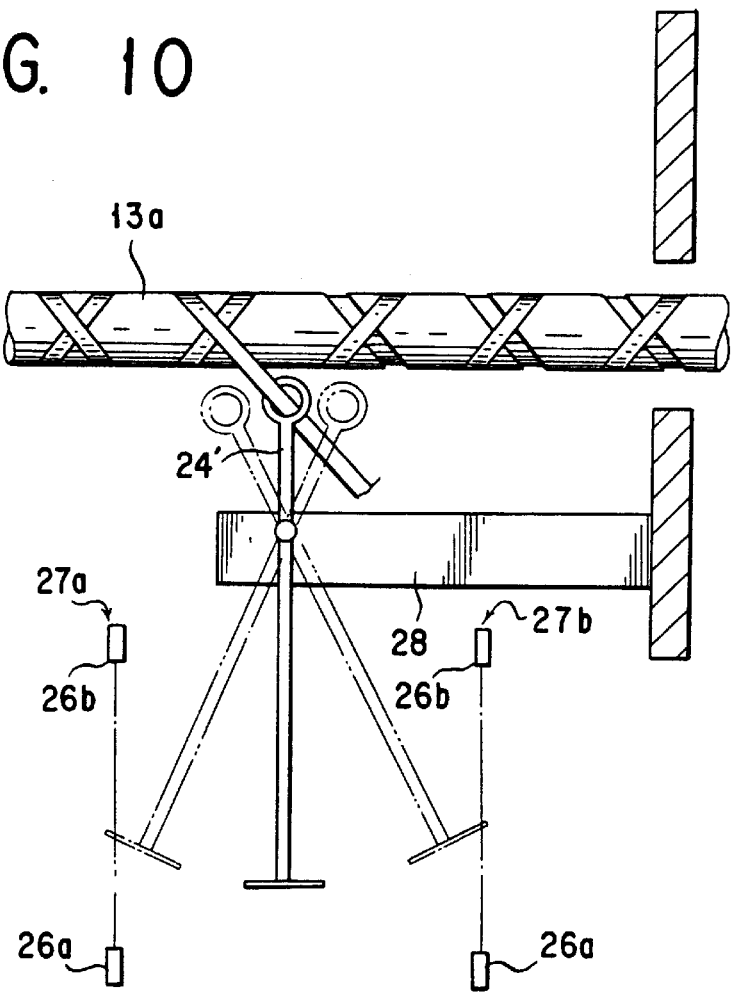
FIG. 10 is a view showing an important portion of another example of a tape take-up portion of the embodiment of FIG. 4.

FIG. 10 shows another example of the tape take-up guide means, in which a pair of sensors 27a and 27b each composed of a laser beam transmitting section 26a and a laser beam receiving section 26b are arranged in place of the angle sensor 23 for detecting movement limit positions in both moving directions of a free guide 24'. The free guide 24' is pivotally supported at its intermediate portion by a support member 28 so as to swing in accordance with the tape take-up position of the tape 15. When any shifting in the drawing direction of the molded rod 13a by a constant amount (for example, 5 mm) is caused, this shifting position crosses the laser beam emitted from one of the sensor 27a (27b) and the shifting is detected and, upon the detection, the tape take-up speed is controlled to increase (or decrease).

Further, it is to be noted that, without being limited to the described example, the tape take-up position will be controlled, with the take-up operation being done with the same pitch, by properly controlling the rod molding speed, the tape wind-up rotation speed and the tape take-up rotation speed.

The rod drawing device 6 serves to clamp the molded rod 13a and pull it in the drawing direction, and the drawing force for drawing the reinforcing fibers 7 from the roving rack 1 is essentially caused by the pulling force of this drawing device 6.

As shown in FIG. 4, the rod drawing device 6 of belt-type structure is utilized, but as shown in FIG. 11(a), FIG. 11(b) and FIG. 11(c), there is adopted a mechanism in which two sets of clamp devices 29 and 30 are arranged with a space in the drawing direction to be reciprocal in that direction so as to draw out the rod while repeating the clamping and unclamping operations alternately.

A method of manufacturing an FRP rod provided with crossing grooves having a diameter of 8 mm by using the apparatus of the structure mentioned hereinbefore will be described hereunder.

First, a number of reinforcing fibers 7 (carbon fibers manufactured by Toray Industry, Inc. as T-700S-12K) are drawn out from the roving rack 1 through the driving of the rod drawing device 6 while tension of 400 to 500 g is applied thereto by the torque limiter 9, and a total tension of 30 kg is applied to the reinforcing fibers 7.

The reinforcing fibers 7 are then impregnated with an epoxy resin (Shell 9400 manufactured by Shell Corp.) in the resin bath unit 2 and squeezed by the squeeze member 14. The reinforcing fibers 7 are thereafter are bundled as fiber bundle 13 impregnated with unhardened matrix resin and preformed in the shape of rod to be molded.

The tape winding operation for the winding of the tape 15 through the tape wind-up device 5 is performed, as shown in FIG. 7, by feeding the tape 15 with an angle $\theta_2$ of the tape 15 to the fiber bundle 13, and the angle $\theta_2$ is set to be equal to the winding angle $\theta_1$ of the tape 15 on the fiber bundle 13. In the case where these angles $\theta_1$ and $\theta_2$ are different from each other, the winding pitch will be shifted or the tape 15 wound up will be warped, which may cause a product to have an abnormal nature or may damage the continuous moldability.

In these operations, in order to obtain a rod having a groove depth of 0.12 mm, a groove specific surface area of 36% and a pitch of 40 mm, a tape made from Tetron (as textile fiber, a plane weave tape formed of warp yarn: 100D/31 numbers of twist yarns; weft yarn: 200D×2; weft yarn density: 38 numbers/3 cm) having a thickness of 0.12 mm and a width of 4 mm was used. The tape wind-up speed was set to 12.5 r.p.m. and the tape drawing tension was set to 200 g. Such tapes were wound up, in crossing fashion, around the fiber bundles 13 impregnated with the unhardened resin by two sets of the tape wind-up devices 3, 3, and then guided to the heat molding device 4.

In the heat molding device 4, since an inlet of it has a circular corner portion and provides a taper shape, the fiber bundles 13 are smoothly guided into the mold. The tape 15 wound up around the fiber bundle 13 is gradually pressed against and bites the surface of the fiber bundle 13. Finally, the tape surface is pressed so as to be made flat to the fiber bundle surface and guided along the inner surface of the mold, whereby the tape wind-up position is never shifted, the tape molding operation can be surely performed, and at the same time, the surface of the fiber bundle 13 moves along the inner surface of the mold to effectively harden the unhardened resin.

In the next step, the tape 15 is peeled off by the tape take-up device 5 from the molded rod 13a hardened by heat in the heat molding device 4 and delivered therefrom, thereby producing an FRP rod as a product.

During this operation, the tape 15 to be taken up is guided by the free guide 24', and in this operation, when the tape take-up position is shifted by, for example, 5 mm, the angle sensors 23, 27a and 27b are operated and the tape take-up rotation speed is accordingly controlled. For example, with reference to FIG. 9, when the angle sensor 23 detects the shifting of the position of the free guide 24 by 5 mm to the side of a, the tape take-up rotation speed is made fast in response to a signal from the angle sensor 23, and on the other hand, when the angle sensor 23 detects the shifting of the position of the free guide 24 by 5 mm to the side of b, the tape take-up rotation speed is delayed in response to a signal from the angle sensor 23, and through these operations, the position correction is done so that the shifting of the free guide position is always in a range of ±5 mm.

According to the method described above, when a concrete reinforcing member provided with cross spiral grooves was molded at a molding speed of 50 cm/min., no inconvenience was caused and a preferable molding was performed even in a continuous molding process by 1000 m of the tape for one day only by supplying the resin every predetermined time interval. Moreover, the nature and the feature of the quality of a product was not changed from the operation starting time to the operation ending time. The average rod pulling strength was 12 ton and the average concrete adhesive force was 85 $kg/cm^2$ (concrete compression force of 368 $kg/cm^2$).

In the above molding process, since the tension is applied to the reinforcing fibers 7, the reinforced fibers are finely pulled in parallel in the resin bath 2 with no intertwinement of the fibers 7 therein and the resin uniformly impregnates. The generation of feather of the fiber bundle 13 impregnated with the unhardened resin is suppressed by the squeeze member 14 and the excessive resin is removed thereby. Moreover, according to the tension force of the squeeze member 14, the slack or shifting of the fiber bundle 13 at the tape wind-up time and the twisting of the reinforcing fibers 7 due to the tape wind-up can be prevented from causing.

Further, it is to be noted that the total tension of the reinforcing fibers 7 is not always constant, and it can be regulated in accordance with the changes of the rod diameter, the groove shape, the tape wind-up tension, the molding speed or other conditions.

The term "tape" used herein for the present invention is represented by one having a flat shape and the following functions or natures.

(1) A tape capable of being impregnated with a resin, and that is, a tape having a nature such that an unhardened resin impregnates in an inner gap of the tape.

(2) A tape having an expandible and contractible property and capable of being fitted to a fiber bundle at the tape wind-up time.

(3) A tape being composed of a material having a small volume ratio and a tape free from wrinkling at the heating time in a mold, for example:

1) One woven from continuous fiber such as woven fabric.

2) One assembled in random with non-continuous fiber composed of short fiber and long fiber such as non-woven fabric, paper or mat.

3) One formed by twisting non-continuous fiber with continuous fiber. As the fiber, there is used natural fiber such as cotton or hemp, synthetic fiber such as polyester or vinylon, semisynthetic fiber such as acetate, regenerated man-made fiber such as rayon, or inorganic fiber such as metal or glass.

4) One formed of a sponge like material.

A tape formed of a sponge like material represents a tape of open-cell foam, and babbles are continuously formed through which fluid freely passes. Further, a reinforcing material may be mixed with the tape as occasion demands. Such a sponge will be manufactured as follows.

(1) Mixing an expanding agent or foaming agent easily gasifiable by applying heat or sub-component;

(2) Using a gas generated at a time of plastic manufacturing;

(3) Blowing the gas; and (4) Opening a hole in a mechanical or electrical manner.

Further, as the sponge tape forming method, there are provided the following methods.

(1) Continuous forming method such as calender, extrusion or conveyer belt casting method.

(2) Batch-type forming method such as casting, injection or hot pressing method. All sponge tapes manufactured by the above general methods will be adapted.

The material constituting the spiral-grooved rod includes, as a reinforcing fiber, inorganic fiber such as carbon fiber or glass fiber, or organic fiber such as aramid fiber, and as a matrix fiber, thermosetting resin such as epoxy resin, unsaturated polyester, or phenol resin. In the present invention, these materials are used as examples, thermoplastic resin such as nylon or polyester may be utilized as occasion demands, and the rod may be molded through a cold hardening process in place of heat hardening process.

The use of the flat tape makes it possible that, for example, in order to obtain a rod provided with cross-spiral grooves having a diameter of 8 mm, a groove depth of 0.12 mm and a groove specific surface area of 36%, when a tape being made of fibers and having a thickness of 0.12 mm and width of 4 mm is used, the pitch will be set to 40 mm.

Further, in comparison, in a case where a filament-like material having a diameter of 0.24 mm in the conventional molding method as mentioned hereinfirst is used for forming a groove, when the filament-like material having a diameter of 0.24 mm is embedded in a half portion of a rod, it is necessary to set the pitch to 1.3 mm for obtaining the surface area of the groove described above. With such a small pitch, it is known that there causes a turbulence in the orientation of the fiber in the rod during the filament wind-up process or filament take-up process and the turbulence will result in the lowering of the strength. In addition, the production of the rod with such a small pitch is not practical. Accordingly, it is desired as in the present invention to use a tape having a flat sectional shape to obtain a large specific groove surface area.

Figure 12:
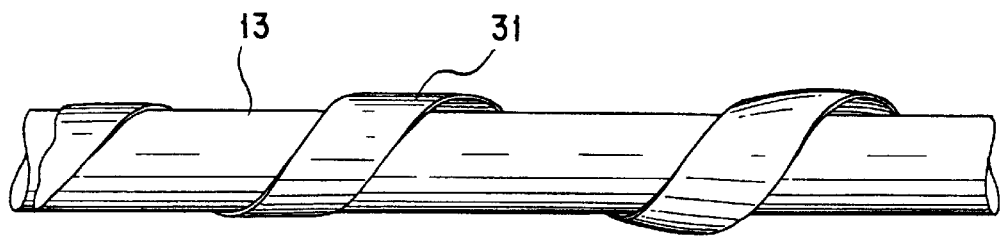
FIG. 12 is a view showing an inconvenience of a film-shaped tape winding condition.

Further, even in a case where a tape having a flat shape similar to that of the present invention is used, when a film-shaped tape is used, one side surface of a film-shaped tape 31, as shown in FIG. 12, likely rises because of a slight shifting in angle. However, in a case where the tape used for the present invention is used, there is no rising of the tape even if the groove angle $\theta_1$ and the tape wind-up angle $\theta_2$ slightly diverge as in the film-shaped tape. That is, the tape 15 has a large shearing deformation because it has an expandible and contractible property and, hence, the fiber bundle 13 impregnated with the unhardened resin and the tape 15 are easily fitted together. Accordingly, when the tape 15 of the present invention is used, it is not necessary to pay a severe attention to the adjustment of the tape wind-up angle $\theta_2$, but when the film-shaped tape 15 is used, a severe adjustment of the wind-up angle $\theta_2$ is required.

Figure 13:
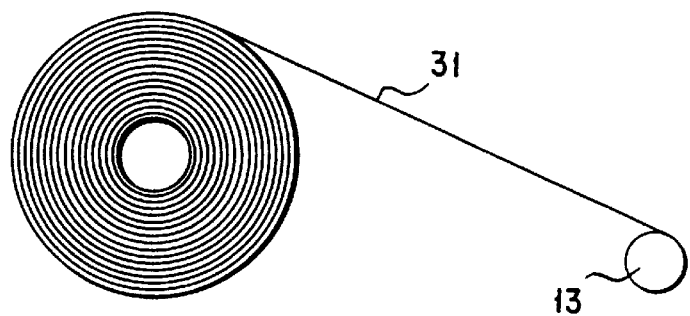
FIG. 13 is a front view showing a film-shaped tape winding condition.
Figure 14:
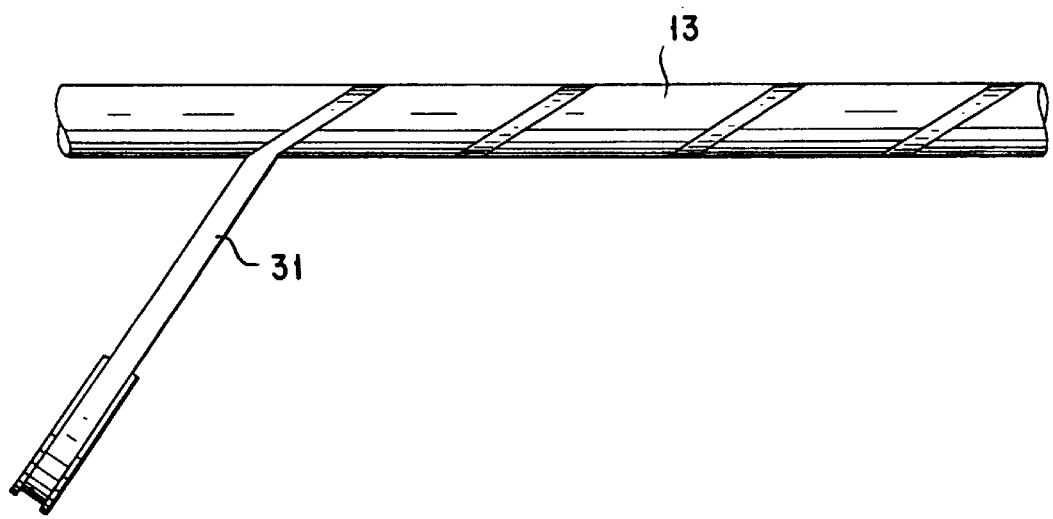
FIG. 14 is a plan view showing a film-shaped tape winding condition.

Further, in a case where the tape is pulled out from the tape supply bobbin, as shown in FIGS. 13 and 14, when the film-shaped tape is used, it is necessary to be wound up in a concentric fashion to prevent wrinkles at bilateral re-wound portions from causing, which will limit the length of the tape to be used.

Although the example of the present invention was described with reference to the manufacturing of the rod having a circular cross section, the present invention is not limited to such example. For example, in a case where a rod having at least one side having an angle less than 90° in section (such as triangular, rectangular or T shape), when the fiber made tape is wound up, the tape bites considerably deeply in the rod, thus being not usable, but when a rod having a hexagonal or an elliptic section is used, the tape bites in an amount smaller than that in the rod of the sectional shape mentioned above, and accordingly, such hexagonal or elliptic rod may be used as occasion demands.

In the present invention, the numbers of the reinforcing fibers (Vf), the rod diameter, the groove depth, the groove surface area, etc. may be optionally selected in accordance with the strength, the concrete adhesive force and the like to be required for the rod to be molded. That is, since the rod diameter, the fiber numbers (Vf) and the groove depth for the required strength are relatively prescribed, the thickness of the tape and the numbers of the tapes are selected, and the rod draw-out speed, the tape wind-up rotation speed (in the case of a plurality of tapes, the respective tape wind-up rotation speeds) and the tape wind-up rotation direction are set so that the groove surface area conforms to the required concrete adhesive force.

Figure 15A:
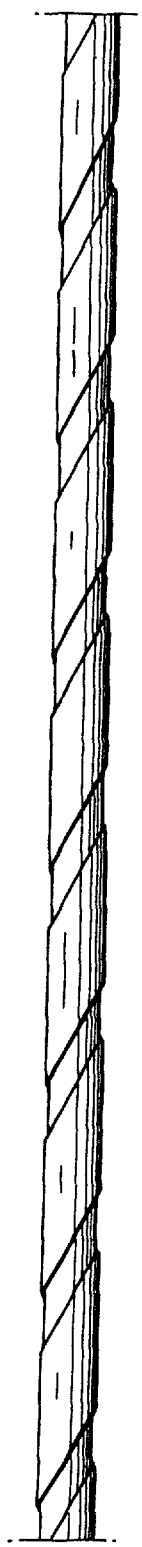
FIG. 15(a), FIG. 15(b) and FIG. 15(c) are each front view of examples of a fiber reinforced plastic rod formed with a spiral groove manufactured by the method and apparatus according to the present invention.
Figure 15B:
Figure 15C:
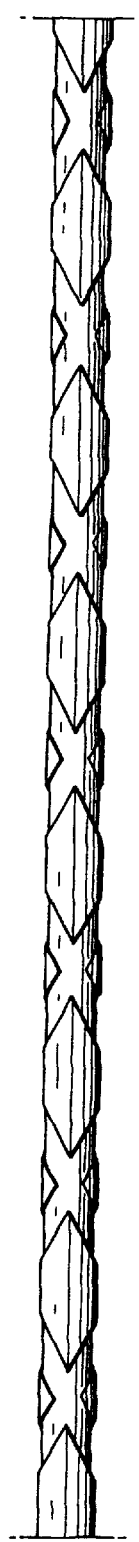

Examples of rods molded by the method and apparatus of the present invention are explained hereunder with reference to FIG. 15.

(1) One thread groove (FIG. 15(*a*)). Width and pitch thereof may be changed variously.

(2) One thread groove having a pitch which is gradually shifted (FIG. 15(*b*)).

(3) Cross grooves (FIG. 15(*c*)). Respective widths and pitches thereof may be changed variously.

(4) The above types of grooves are mixed in arrangement in the axial direction.

Comparative examples with respect to the above embodiments of the present invention will be described hereunder.

(COMPARATIVE EXAMPLE 1)

The molding processes were carried out by substantially the same method except that the tension to the fiber 7 in the roving rack 1 is released.

The result is as follows.

(1) The carbon fiber bundle was largely swelled at the preform portion and feather was generated.

(2) The carbon fiber bundle 13 were largely swung by winding up the woven fabric around the wound-up portion and the swing results in the torsion of the carbon fiber bundle 13, thus being inconvenient. When the molding of the fiber of about 50 m was carried out, the carbon fiber clogged at the preform portion and it becomes impossible to continue the molding process.

(COMPARATIVE EXAMPLE 2)

The molding processes were carried out by substantially the same method except that the tension was not applied at the time of the tape wind-up process.

As a result, the tape was slackened from the molding starting time at the mold inlet portion and a product obtained had a groove uneven in shape.

(COMPARATIVE EXAMPLE 3)

The molding processes were carried out by substantially the same method except that a Tetron code (string formed by knitting Tetron fibers in a round shape) was used. As a result, (because of the small taper of the mold inlet portion), the Tetron code was completely slackened in a time of molding of the code of about 10 m and a product thus obtained had a groove having uneven pitch.

(COMPARATIVE EXAMPLE 4)

The molding processes were carried out by substantially the same method except that a mold used is not provided with a tapered portion but formed with a circular portion having a radius of 3 mm at an inlet portion was effected to the mold used. As a result, the Tetron tape was completely slackened at the mold inlet portion in a time of molding the tape of the length of about 5 m and a product thus obtained had a groove having uneven pitch.

Furthermore, when the mold is provided with no tapered portion, the wound tape is shifted. If the wound tape is extremely shifted, the shape of the rod is made irregular, and this irregularity is made remarkable through a continuous molding process and the tape is raised up from the unhardened resin impregnated fiber bundle at the mold inlet portion. The tape is stored in that portion and the rod cannot be molded with a groove having a constant shape.

Although the present invention has been illustrated and described with respect to exemplary embodiments thereof, it should be understood by those skilled in the art that the foregoing and various other changes, deletions and additions may be made thereto without departing from the scopes of the present invention. Therefore, the present invention should not be understood as limited to the specific embodiments described above but to include all possible embodiments which can be embody within a scope encompassed and equivalents thereof with respect to the features recited in the appended claims.

We claim:

1. A method of continuously draw-molding a fiber reinforced plastic rod formed with a spiral groove comprising the steps of:

arranging under tension in parallel a plurality of reinforcing fibers;

impregnating an unhardened thermosetting resin in the reinforcing fibers with tension being applied to the reinforcing fibers;

winding a tape having a resin impregnable property and an expandable and contractible property around a fiber bundle composed of the thermosetting resin impregnated reinforcing fibers in a spiral fashion with a winding angle being substantially equal to an angle of the spiral groove with respect to an axial direction of a rod to be molded;

passing the fiber bundle with the wound tape in a heating mold wherein said mold is provided with a hole having a cross section substantially equal to that of the rod to be molded to heat and harden the thermosetting resin, wherein a surface of the tape is pressed so as to be flat relative to the surface of the fiber bundle and guided along an inner surface of the mold, such that said inner surface and said surface of the tape are contacting; and taking up the tape thereafter.

2. A method of continuously draw-molding a fiber reinforced plastic rod formed with a spiral groove according to claim 1, wherein said hole of the heating mold has an inlet portion formed with a taper portion widened in diameter at inlet side and the fiber bundle is guided into the heating mold through the inlet portion.

3. An apparatus for continuously draw-molding a fiber reinforced plastic rod formed with a spiral groove comprising:

a fiber supplying device for supplying a fiber bundle which is composed of a plurality of fibers under predetermined tension being applied, said fiber supplying device including a roving rack for drawing a number of reinforcing fibers while applying tension thereto, said tension being applied by a torque limiter mounted to rotation support portions of bobbins around which reinforcing fibers are wound and the bobbins are rotated against rotation resistance of the torque limiters, and a resin bath unit having a resin bath containing thermosetting resin in a molten state;

a resin impregnating device for impregnating an unhardened thermosetting resin in the fiber bundle supplied from the fiber supplying device;

a tape wind-up device for applying a tension to a tape and winding the tape around the fiber bundle at a constant tape wind-up angle on the fiber bundle with a predetermined pitch;

a heating mold having a cross-sectional shape substantially equal to that of a rod to be molded, in which the thermosetting resin is hardened during the passing of the fiber bundle in the heating mold;

a tape take-up device, including a control mechanism for controlling a tape take-up position to be substantially constant, for taking up the tape, from the fiber bundle discharged from the heating mold; and a rod drawing device for drawing out the rod molded in the heating mold therefrom at inlet side.

4. An apparatus for continuously draw-molding a fiber reinforced plastic rod formed with a spiral groove according to claim 3, wherein said heating mold has a hole having an inlet portion formed with a taper portion widened in diameter.

5. A method as set forth in claim 1, wherein said step of winding said tape is carried out in a spiral fashion in a first spiral winding direction, followed by a second step of winding said tape in a second spiral fashion in a second spiral winding direction opposite to said first winding direction.

6. A method as set forth in claim 5, wherein said step of taking up said tape is carried out in a second spiral direction repeated by a step of taking up said tape carried out in a first spiral direction opposite to said first spiral direction.

7. A method as set forth in claim 1, wherein said step of arranging under tension in parallel a plurality of reinforcing fibers further includes the steps of guiding a number of said reinforcing fibers from a roving rack to a resin bath, bundling said reinforcing fibers into a fiber bundle, and squeezing said bundle for removing excessive resin prior to the winding step.

8. A method as set forth in claim 1, wherein said step of taking up the tape is performed by a guide means for taking up the tape, and further includes the steps of detecting shifting of the tape in an axial direction with a sensor on a free guide, and upon detection, controlling the rotating speed for tape take-up to increase or decrease.

9. A method as set forth in claim 1, wherein said step of taking up the tape is performed by a take-up guide means for transmitting a laser beam and receiving said laser beam for detecting movement limit positions in both moving directions of a free guide, and upon detection controlling tape take-up speed to increase or decrease.

10. An apparatus for continuously draw-molding a fiber reinforced plastic rod formed with a spiral groove as set forth in claim 3, further including a plurality of guide members, for guiding a number of the reinforcing fibers drawn from the roving rack to the resin bath and a squeeze member on an outlet side of the resin bath unit and adapted to bundle the reinforcing fibers into a fiber bundle and to squeeze it for removing excessive resin.

11. An apparatus for continuously draw-molding a fiber reinforced plastic rod formed with a spiral groove as set forth in claim 4, wherein the tape wind-up device comprises a rotary plate through which a fiber bundle penetrates, a tape bobbin, a tape guide for guiding the tape fed from the tape bobbin, and a torque limiter for applying predetermined tension to the tape.

12. An apparatus for continuously draw-molding a fiber reinforced plastic rod formed with a spiral groove as set forth in claim 4, further including a second tape wind-up device for winding a tape around the fiber bundle at a constant tape windup angle on the fiber bundle with a predetermined pitch and in a winding direction reverse to the other wind-up device.

13. An apparatus as set forth in claim 12, wherein said tape take-up device further includes a second tape take-up device, said tape take-up devices having take-up directions reverse to each other and corresponding to the directions of the tape wind-up devices.

* * * * *